(No Model.)  2 Sheets—Sheet 1.
F. BOCCARD.
WINDMILL.
No. 385,401.  Patented July 3, 1888.
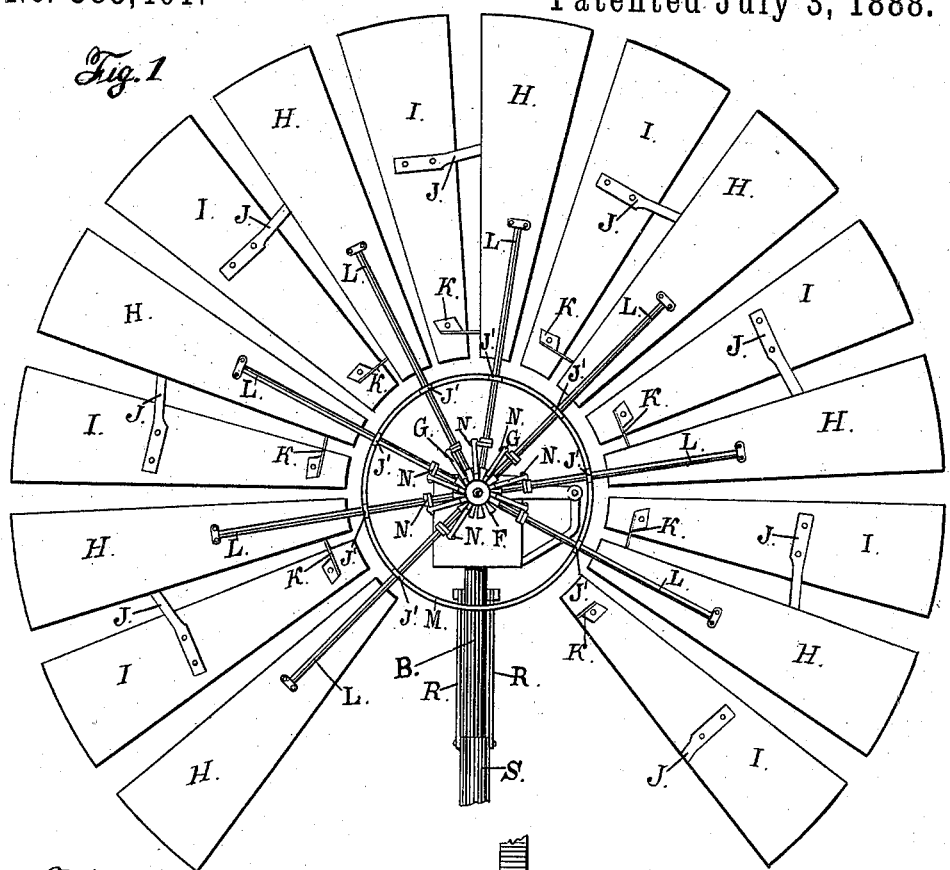
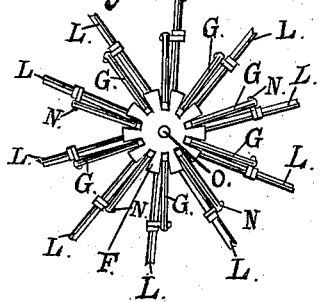
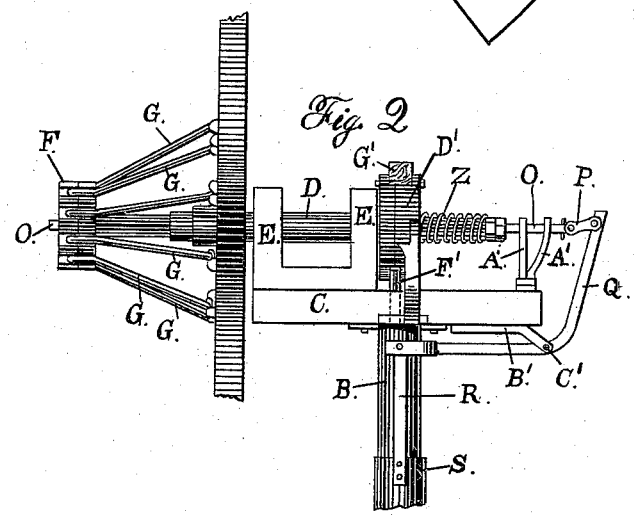
ATTEST.  INVENTOR,
K. B. Redstone.  Francis Boccard,
A. T. Dozier.  By John H. Redstone,
  Atty in Fact.

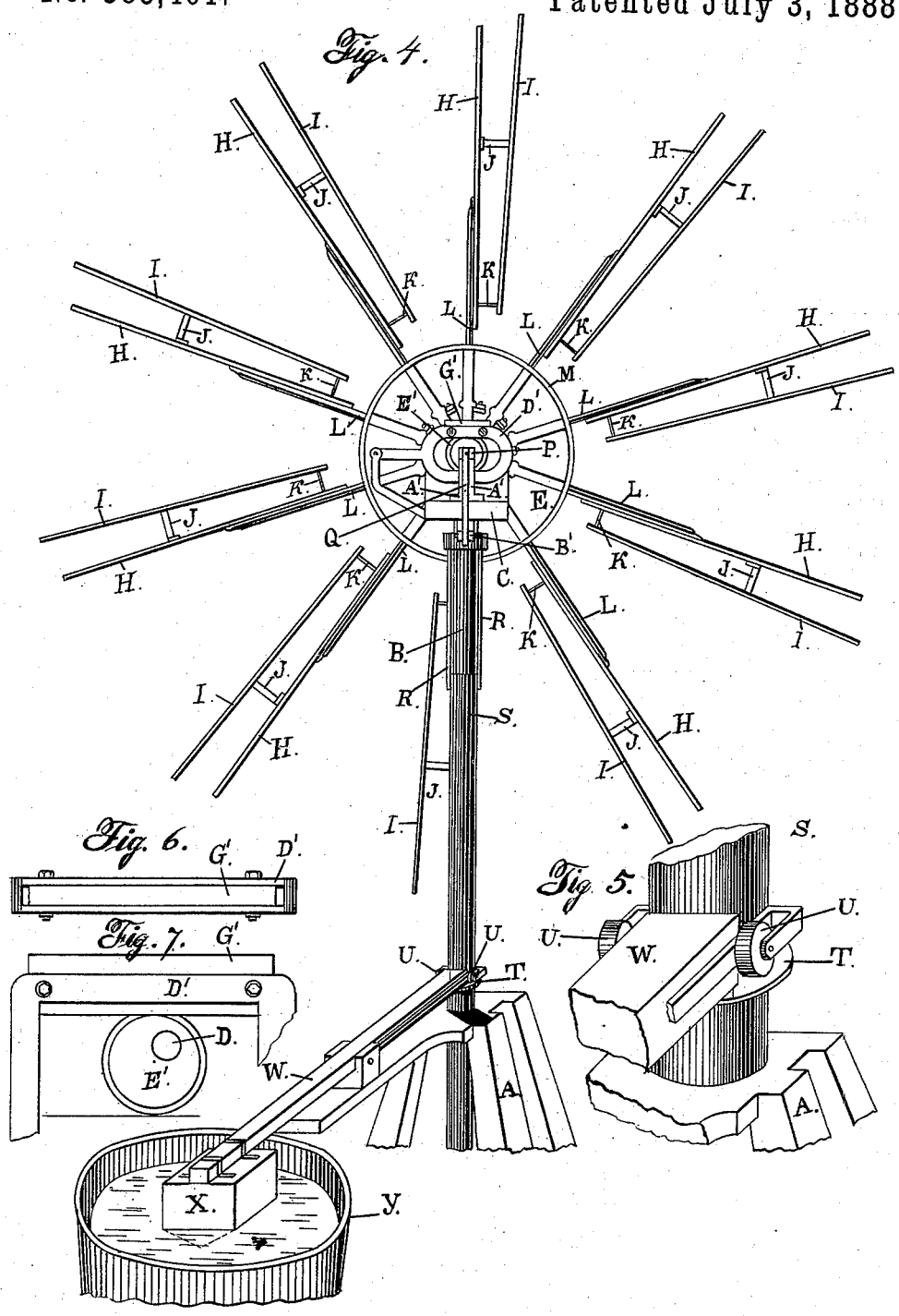

United States Patent Office.

FRANCIS BOCCARD, OF OAKLAND, CALIFORNIA.

WINDMILL.

SPECIFICATION forming part of Letters Patent No. 385,401, dated July 3, 1888.

Application filed April 3, 1888. Serial No. 269,514. (No model.)

*To all whom it may concern:*

Be it known that I, FRANCIS BOCCARD, a citizen of the United States, residing in Oakland, in the county of Alameda and State of California, have invented a new and useful Windmill, of which the following is a specification.

My invention relates to improvements in windmills, which will be understood by reference to the accompanying drawings and the letters referring thereto.

Figure 1 is a broken front elevation showing a part of the wings removed; Fig. 2, an enlarged broken side elevation; Fig. 3, a broken front elevation showing the center of the wheel upon the same scale as Fig. 2; Fig. 4, a broken rear perspective view showing the edge view of the wings and the top portion of the main supporting-frame and the water-tank; Fig. 5, a broken side elevation; Fig. 6, a plan view of the yoke; Fig. 7, a broken view showing a side elevation of the eccentric or cam for producing the motion of the pump-rod.

The following is the construction of my improved windmill: A represents the main frame of the machine; B, the central upright supporting-shaft, which serves as the pivot upon which the windmill is revolved to receive the action of the wind; C, the bed-plate, which supports the driving-shaft to which the wings are attached, and which operates the pump-cam.

D represents the driving-shaft.

E represents the journal-blocks which support the driving-shaft.

F represents the the hinge-plate, to which the automatic adjusting connecting-rods are attached.

G represents the automatic adjusting connecting-rods.

H and I represent the wings; J and K, the wing connecting and supporting bars; L, the wing pivot-rods, by which they are attached.

M represents the main supporting-ring for the wings.

N repesents the cranks or levers, which are operated for turning the wings.

O represents the central connecting-shaft for operating the wings as the water in the tank is raised or lowered.

P represents the connecting-link, which connects the shaft or rod O, as will be shown.

Q represents the connecting-lever, which connects with the operating-sleeve S by means of the connecting-rods R.

T represents the shelf or rest upon the lower end of the sleeve S, for the purpose of operating the sleeve S by means of the anti-friction rolls U and the float-lever W. The float X rests in the water shown in the tank Y.

Z represents the returning-spring, which forces back the rod O and adjusts the wings to the wind when the water is lowered in the tank.

A' represents the guide-frame for the connecting-rod O.

B' represents the hanger for lever Q.

C' represents the pivot of the lever Q.

D' represents the pump-rod yoke.

E' represents the cam or eccentric which operates the pump-rod.

F' represents the pump-rod.

G' represents the wooden bearing for the eccentric.

I form the main frame A of any suitable framing material—such as is usually employed in that class of construction.

The main pivot-shaft B is a hollow metal post through which the pump-rod works. The bed-plate C and pillow-blocks E, I generally frame of wood, although I sometimes employ a metal frame and bearings for the shaft D, which supports the wings. I attach connecting-rods G to the wings by means of the cranks N and connect with the hinge-plate F. To the hinge-plate F, in the center, I attach the shaft O, which is supported by the guide-frame A' and passes through the center of the shaft D. I connect the lever Q with the connecting-rod O, for the purpose of withdrawing the same and turning the wings H I back from the wind when the water raises the float X in the tank, consequently forcing the shelf T, sleeve S, and connecting-rods R down, thereby operating the lever Q and forcing the rod O in and carrying the hinge-plate F back and drawing the wings H I around back from the wind, thereby stopping or decreasing the speed of the wings. As the water is lowered in the tank, the float X descends, raising the lever W from the shelf T and allowing the sleeve S and rods R to rise and the lever Q to be operated by the spring Z, and the rod to be withdrawn and the wings to be swung around to the wind by the hinge-plate F, rods G, and cranks N, thus setting the wheel going and consequently the pump to working.

The wings H I being attached to the rods L and allowed to turn in the bearings J', and the wing divisions I being removed to one side from the axis of said rod L, any excessive pressure of the wind carries the division or section I back from the wind, thus decreasing the revolutions of the wind-wheel.

It it understood that as the wings are turned back from the wind the hinge-plate F is thrown out, pressing back the spring Z and operates the lever Q, the rods R, sleeve S, lever W, and float X, as has been shown.

Having thus described my invention, what I claim, and desire to secure by Letters Patent, is—

In combination with a wind-wheel having the wings formed of the sections H and I, connected by bars J and K and attached to the pivot-rods L, the crank N, connecting-rods G, hinge-plate F, central connecting-rod, O, link P, lever Q, rods R, sleeve S, shelf T, lever W, and float X, for the purpose of regulating and adjusting the wings H I, constructed and operated substantially as and for the purposes set forth.

FRANCIS BOCCARD.

Witnesses:
 JOHN H. REDSTONE,
 A. G. PAGE.